United States Patent
Brenner et al.

(10) Patent No.: US 9,583,021 B2
(45) Date of Patent: Feb. 28, 2017

(54) NASAL PINWHEEL FOR ASSISTING CHILDREN IN NOSE BLOWING

(71) Applicants: Eric Brenner, New Providence, NJ (US); Joseph Schultz, Atlanta, GA (US); Alphonse Van Woerkem, New York, NY (US)

(72) Inventors: Eric Brenner, New Providence, NJ (US); Joseph Schultz, Atlanta, GA (US); Alphonse Van Woerkem, New York, NY (US)

( * ) Notice: Subject to any disclaimer, the term of this patent is extended or adjusted under 35 U.S.C. 154(b) by 300 days.

(21) Appl. No.: 14/212,052

(22) Filed: Mar. 14, 2014

(65) Prior Publication Data

US 2015/0262502 A1  Sep. 17, 2015
US 2016/0055759 A9  Feb. 25, 2016

Related U.S. Application Data

(60) Provisional application No. 61/798,312, filed on Mar. 15, 2013.

(51) Int. Cl.
*G09B 19/00* (2006.01)

(52) U.S. Cl.
CPC ......... *G09B 19/00* (2013.01); *G09B 19/0076* (2013.01)

(58) Field of Classification Search
USPC ........ 434/236, 247, 258; 446/176, 200, 201, 446/202, 203, 271, 218, 236, 238, 256, 446/259
See application file for complete search history.

(56) References Cited

U.S. PATENT DOCUMENTS

| | | | | |
|---|---|---|---|---|
| 146,334 | A | * | 1/1874 | Hagstrom ............... A63H 33/40 446/202 |
| 396,295 | A | * | 1/1889 | Schofield ............... A63H 33/40 446/205 |
| D31,876 | S | * | 11/1899 | Couchois ...................... 446/204 |
| 764,546 | A | * | 7/1904 | Bardsley .................. A61B 5/09 600/539 |
| 871,399 | A | * | 11/1907 | Green .................... A63H 37/00 446/202 |
| 1,529,568 | A | * | 3/1925 | Ananian ................ A63H 33/40 446/207 |

(Continued)

OTHER PUBLICATIONS

"Talking Child.com: Nose Whistle", Nov. 20, 2008 [retireved online Aug. 23, 2013].*

(Continued)

*Primary Examiner* — Kurt Fernstrom
(74) *Attorney, Agent, or Firm* — Mountain IP, pLLC

(57) ABSTRACT

Provided herein is a device (and associated method of using the device) to aid and educate a child in blowing their nose. The device comprises a pinwheel assembly, which is positioned under the child's nostrils such that air expelled from the nostrils will turn the blades of the pinwheel. The device optionally comprises a pacifier, which is configured such that when the nipple of the pacifier is in the child's mouth, the pinwheel assembly is positioned such that air expelled from the child's nostrils will turn the blades of the pinwheel assembly. Other configurations include cups, which encircle the child's mouth, and handles which aid in the proper positioning of the device.

9 Claims, 4 Drawing Sheets

(56) References Cited

U.S. PATENT DOCUMENTS

| | | | | | |
|---|---|---|---|---|---|
| 1,613,982 | A | * | 1/1927 | Cohn | A63H 5/00 |
| | | | | | 446/205 |
| 1,629,135 | A | * | 5/1927 | Vinson | A63H 1/08 |
| | | | | | 446/202 |
| 2,703,407 | A | * | 3/1955 | Henoch | A47K 13/24 |
| | | | | | 248/205.5 |
| 3,628,280 | A | * | 12/1971 | Nave | A63H 33/40 |
| | | | | | 446/200 |
| 3,867,770 | A | * | 2/1975 | Davis | G09B 19/04 |
| | | | | | 434/185 |
| 4,281,472 | A | * | 8/1981 | Hill | A63H 33/40 |
| | | | | | 446/26 |
| 5,758,638 | A | * | 6/1998 | Kreamer | A61M 15/009 |
| | | | | | 128/200.14 |
| 9,084,859 | B2 | * | 7/2015 | Connor | A61M 16/0066 |
| 2009/0044808 | A1 | * | 2/2009 | Guney | A61M 16/0666 |
| | | | | | 128/206.24 |
| 2013/0042862 | A1 | * | 2/2013 | Buch | A61J 17/00 |
| | | | | | 128/202.16 |
| 2013/0065209 | A1 | * | 3/2013 | Glass | G09B 19/0076 |
| | | | | | 434/247 |

OTHER PUBLICATIONS

Website description of "Puffshot Marshmallow Shooter," at puffshot.com. Author and publication date unknown. Website visited Mar. 11, 2014.

\* cited by examiner

NASAL PINWHEEL FOR ASSISTING CHILDREN IN NOSE BLOWING

CROSS-REFERENCE TO RELATED APPLICATIONS

This application is based on and claims the benefit of priority of U.S. Provisional Patent Application Ser. No. 61/798,312, entitled "Nasal Pinwheel Toy," filed on Mar. 15, 2013, the contents of which are incorporated by reference.

STATEMENT REGARDING FEDERALLY SPONSORED RESEARCH OR DEVELOPMENT

Not applicable

BACKGROUND

The inventions disclosed herein relates generally to the field of children's toys and health devices, and more particularly to a toy that teaches children to blow through their nose, clearing their nasal passages.

While adults are adept at clearing their nasal passages, i.e. "blowing the nose," this skill is often not readily grasped or readily practiced by the young, e.g. infants, toddlers, and young children. A child's inability, or lack of incentive, to blow their nose results in unsanitary, unsightly discharge and prolongs congestion. Congestion may cause the Eustachian tubes to become blocked by mucus within the tube, leading to discomfort. Often, blockage will allow fluid to build up within the normally air-filled middle ear and this provides a favorable environment for bacteria or viruses, which can cause an ear infection. Many children, up to 80%, will suffer from chronic ear infections, Otitis Media, at some point in their childhood. This can cause terrible pain and suffering as well as lead to long term scarring and hearing damage. The ear-drum can rupture due to this pressure, which can be quite painful. Chronic Otitis Media can lead to persistent blockage of the Eustachian tubes, and complications such as hearing loss, chronic ear drainage, and other symptoms.

Medical procedures and devices are known for clearing blockage of the Eustachian tubes, for example the myringotomy surgical procedure, which can lead to scaring of the ear drum with the possibility of permanent hearing loss, or the Otovent™ medical device, which uses autoinflation of a balloon to create back-pressure to clear the sinuses. Neither is enjoyable for the user. A preferable approach would be to induce the child to regularly blow their nose. One prior art device exists which accomplishes this, known as the "Puffshot™ marshmallow shooter". With this device a child places the large opening of a tube-like object over their nose. At the opposite (distal) end of the tube there is a small hole. A marshmallow is inserted into this small hole and the child exerts force from their nose to cause the marshmallow to shoot out of the hole. The child is then encouraged to eat the marshmallow. Unfortunately, marshmallows are a low-nutrient "junk food" item that also poses a risk of choking.

Accordingly, there is a need in the art for fun, effective devices that incentivize children to blow their noses without the disadvantages of the prior art.

SUMMARY OF THE INVENTION

Disclosed herein are novel devices and methods, which aid in teaching a child to blow his or her nose. The invention comprises the use of a pinwheel. Existing pinwheel toys are blown using the mouth. In the novel devices of the invention, the pinwheels are blown using air expelled from the nose. The experience is enjoyable for the young user, and provides an incentive to blow and clear the nasal passages. Various configurations of the nasal pinwheel are disclosed herein, including designs comprising a pacifier. The invention further encompasses methods of using the disclosed devices and associated business methods.

BRIEF DESCRIPTION OF THE DRAWINGS

FIG. 1 depicts a side view of a device of the invention comprising a pinwheel element having blades (101), the pinwheel element being attached to a mouthpiece element (103) comprising a pacifier by means of an attachment element (102).

FIG. 2.

FIG. 3 depicts a device of the invention comprising a pinwheel assembly (302) affixed to a handgrip comprising a stick-like handle (301) and a mouthpiece (303) comprising a cone-like cup. The mouthpiece encircles the mouth of the user (304), such that exhaled air (306) is preferentially directed from the nostrils of the user (305) and turns the blades of the pinwheel while aiding in nasal clearing.

FIG. 4.

DETAILED DESCRIPTION OF THE INVENTION

Figure 1:
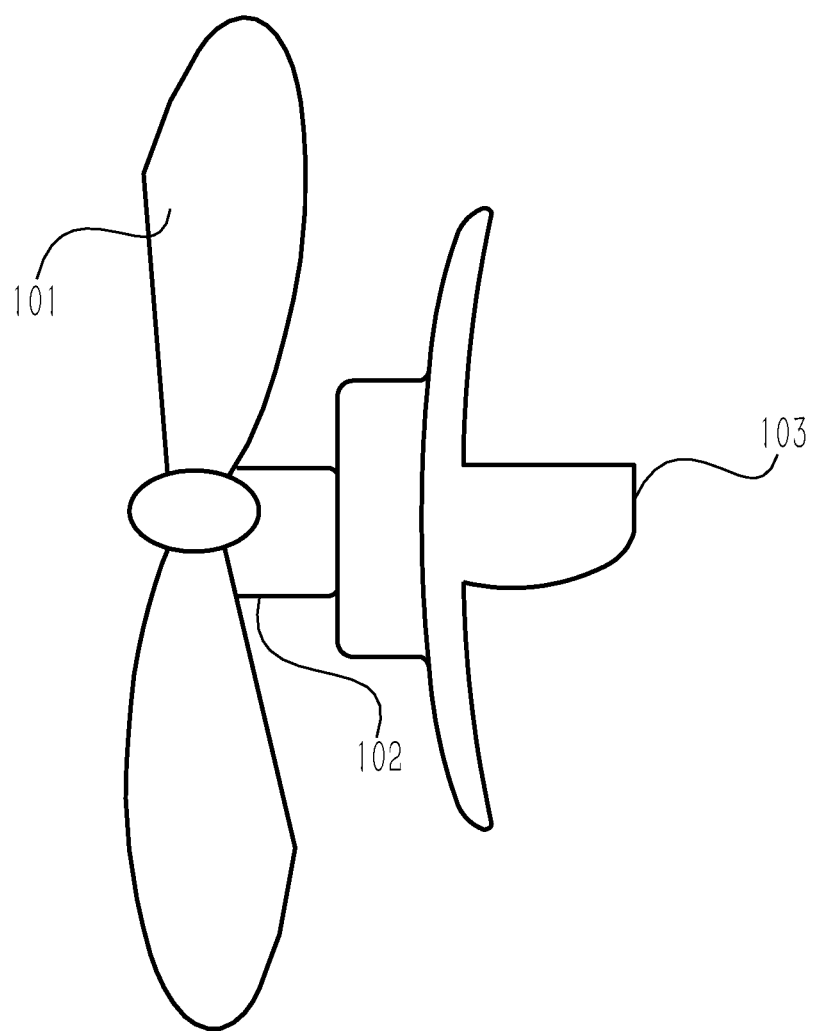
FIG. 1.

In some embodiments, the invention comprises an assembly made up of three elements: (1) a pinwheel element; (2) a mouthpiece element; and, (3) an attachment element. In another embodiment, the three elements comprise: (1) a pinwheel element; (2) a handgrip element; and (3) and an attachment element. In other embodiments, the invention comprises a subcombination of elements, for example, a pinwheel element and an attachment element. Various configurations of each element, and combinations of elements are described below.

The Pinwheel

The pinwheel (also known as a whirligig) element comprises a pinwheel (as the word is known and defined in common usage) or windmill-like structure. The pinwheel comprises a short axle. The axle comprises a pin or a rod-like structure, typically substantially circular in cross section, although other cross-sectional shapes, e.g. square, hexagonal, etc., may be used. The orientation of the long axis of the axle will be described herein as oriented front-to-back. The axle may be of any diameter, for example, from 0.1 to 10 mm. The axle can be composed of a variety of materials including paper, wood, cardboard, plastic or other natural and/or synthetic materials.

Around the axle, the blades of the pinwheel are arranged. The blades of the pinwheel are typically bonded or attached to each other as a single assembly with a central, typically circular, hole through which the axle is placed. The hole is sized such that the blade assembly can freely rotate around the axle.

The front of the axle is capped with a cap, comprising a head, flange or plate, which is bigger than the diameter or cross sectional area of the hole, such that the blade assembly will not slide off the front side of the axle.

The pinwheel is prevented from sliding off the back and front-side of the axle by a backing body, sized such that it is larger than the diameter or cross-sectional area of the hole in the center of the pinwheel. The pinwheel is flanked between the cap and the backing body and may encircle a grommet. The grommet may be flared or collared on each side to the pinwheel in place. The grommet may be made of metal, plastic, paper, rubber or other material. The backing body may comprise a flange, disk, plate or flared region of the axle. Alternatively, in some embodiments of the invention, the backing body is absent, and the pinwheel is blocked from sliding off the back side of the axle by the mouthpiece element or attachment element, as described below.

The blades of the pinwheel are like individual sails, configured to catch a flowing air current, like the blades of a windmill, such that the flowing air will cause the blade assembly to rotate around the axle. The blades are generally configured to catch downward air currents, i.e. air that is moving perpendicular to the axle or transversely with respect to the front-to-back axis of the axle. In most embodiments, the pinwheel will be positioned near the user's nostrils, such that air expelled from the nostrils is in a generally downward and outward direction that will turn the blades of the pinwheel.

Blades are typically constructed from planar materials such as paper or sheets of plastic, acetate, metal foil, soft rubber, such as foam rubber, or other materials. The blades of the pinwheel may be laminated to form composite materials multiple layers to improved strength, stability, appearance or other properties. The use of thin, sheet-like materials such as plastic, acetate, paper, foil, among other materials means the blade can have a low weight-to-surface-area ratio, making the blade assembly easy to turn with low volume air currents.

Generally, it will be preferred that the material from which the blades are made does not have a sharp edge that may impart "paper cuts" or other wounds.

In most orientations, the pinwheel will be below the user's nostrils, and because the user will be expelling air through their nose, the pinwheel will likely get spattered with mucus being expelled from the nostrils. Accordingly, it is preferred that the pinwheel, including the pinwheel blades, be made of materials that are readily washable, or from disposable materials. Washable materials include, for example, plastics and acetate. Dishwasher safe plastics include, for example, polycarbonate, polypropylene, polyvinyl chloride, polyvinyl ethylene, and acrylic. Disposable materials include plastics, acetate, foil, and paper. Paper and other cellulosic materials are especially suitable disposable material as they can be thin, lightweight, adequately stiff, printable, and very inexpensive and may be impermeable or absorbent.

Pinwheels have been known for over 2,000 years, and numerous methods are known in the art for creating pinwheels. From the enormous array of both simple and complex pinwheel designs known in the art, including commercially available devices for children, it is clearly within the skill of the art to readily create any number of effective and aesthetically pleasing pinwheel blade designs.

Any number of blades more than two may be used. In exemplary pinwheel designs, four, five, six, or eight blades are used. The blades may be pointed, rounded, substantially planar, or may comprise complex geometries. If the material from which the pinwheel blades are made is stiff, it is preferred that rounded edges are used to avoid sharp points, which might jab or injure the user. In many embodiments, the blades are curved, curled, folded, or otherwise bent so as to create a lateral surface area that will catch air currents.

In some cases, for example, for ease of manufacture, it may be advantageous to create pinwheel blades assemblies from a single sheet of material. For example, a standard four-bladed pinwheel can be created from a square sheet of material by making four 45-degree cuts at each corner of the square, resulting in new corners. Alternating new corners are then folded towards the center of the square, and the four inwardly folded corners are then pinned at the center. Similarly, the pinwheel may have a plurality of blades greater or lesser then four.

Typically, it will be desirable that the pinwheel blades be made of colored, painted, or printed materials. Age-appropriate coloring and adornment, suitable for the intended user may be employed. Use of reflective materials may be employed as well. Various eye-catching colors, prints, and other pleasing visual designs may be imparted to the pinwheel. The use of printed material allows an opportunity for branding the device. The use of printed material also allows for the inclusion of easily recognized artwork, logos, or characters, for example, cartoon characters, which might be pleasing to the young users of the device.

The size of the pinwheels of the device may vary. A large pinwheel may not easily be rotated by a child, by blowing air through their nose, so smaller sizes are preferred. However, the pinwheel is preferably large enough to be visualized by the child when blowing, and should be of sufficient size that the child can see it moving as air is expelled. Preferred sizes are in the range of 0.5-5 inches in diameter, for example 2-3 inches in diameter. Larger sizes may be employed, so long as the blade assembly can still be turned by air currents generated by a user, in some cases a child, exhaling through their nose. For example, using lightweight materials and low friction while spinning around the axle, a fairly large pinwheel can be rotated with very little lateral airflow.

In one embodiment, the pinwheel is designed to make a noise as it turns, in order to inform that the pinwheel is turning or to make operation of the pinwheel pleasing to the user. For example, the use of bumps or other physical features on the axle may aid in the creation of a noise as the pinwheel rotates around it. Alternatively, features may be added to the blades of the pinwheel to create or enhance sound, as known in the art.

In one embodiment, the pinwheel is designed to display light, in order to inform that the pinwheel is turning or to make operation of the pinwheel pleasing to the user. For example, the use of light-weight LEDs or other light emitting items on the device could be attached to the blades or may be activated by the motion of the blades. LED light is displayed continuously or intermittently and be of one or many different colors. In one embodiment, the device produces a combination of both sound and light, as each is described above.

The Mouthpiece

The mouthpiece portion of the invention comprises a body that may be safely and comfortably held in the mouth of the user, for example, a child. The pinwheel is attached to the mouthpiece element, and the purpose of the mouthpiece is to hold the entire device in such position such that air expelled through the child's nose will turn the blade assembly of the pinwheel.

The mouthpiece is preferably made of soft materials that can be comfortably held in the user's mouth. In some cases, the mouthpiece will be held in place between the user's teeth and/or gums. In some embodiments, the mouthpiece will be held in place by suction as the user sucks on the mouthpiece. The materials must be of sufficient stiffness that they will stay substantially in place when bitten down upon by the user, but soft enough to be comfortable for the user. Preferred materials include various plastics, wood, silicone, latex etc.

In some embodiments, the mouthpiece comprises a plate of soft material, which the user can bite down upon. In other embodiments, the mouthpiece comprises a substantially planar hollow body, for example filled with air or liquid, providing enough "give" to be comfortably bitten. Alternatively, the mouthpiece may comprise a ring, for example a teething ring, as is available in myriad forms. Exemplary teething rings include U.S. Pat. No. 3,753,266, an educational oral hygiene device for young children, which simultaneously serves a teething device and a tooth cleaning device by adjoining a chew ring to a tooth cleaning portion.

Figure 2A:
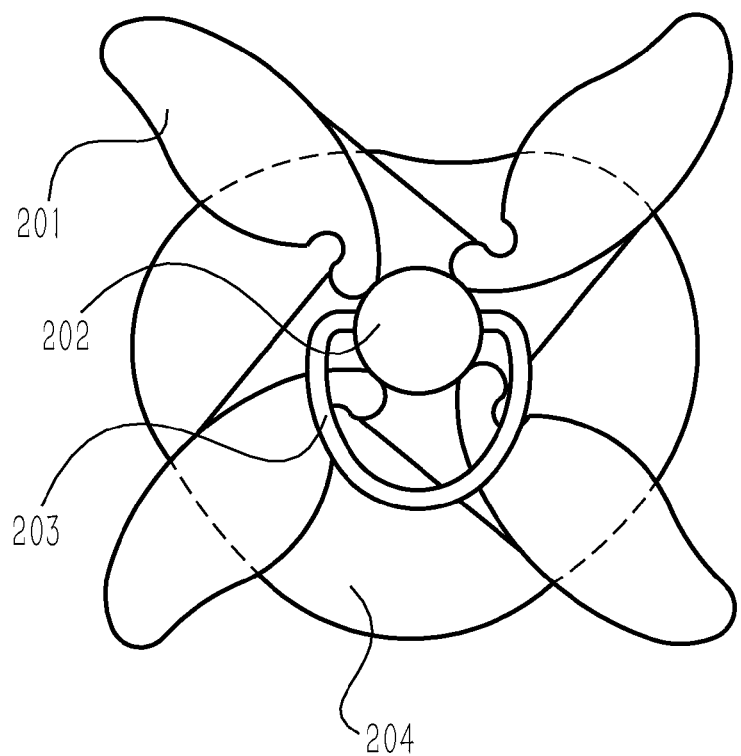
FIG. 2A depicts a front view and FIG. 2B depicts a side view of a device of the invention comprising a pinwheel element affixed to a pacifier mouthpiece. The device comprises a blade assembly (201), a front cap (202), which holds the pinwheel in place and also serves as an anchor for a handgrip comprising a ring (203). A rod (205) acts as an axle around which the pinwheel rotates and connects to an attachment element (206). The attachment element is adhered to the shield or plate of a pacifier (204), comprising a nipple (207).
Figure 2B:
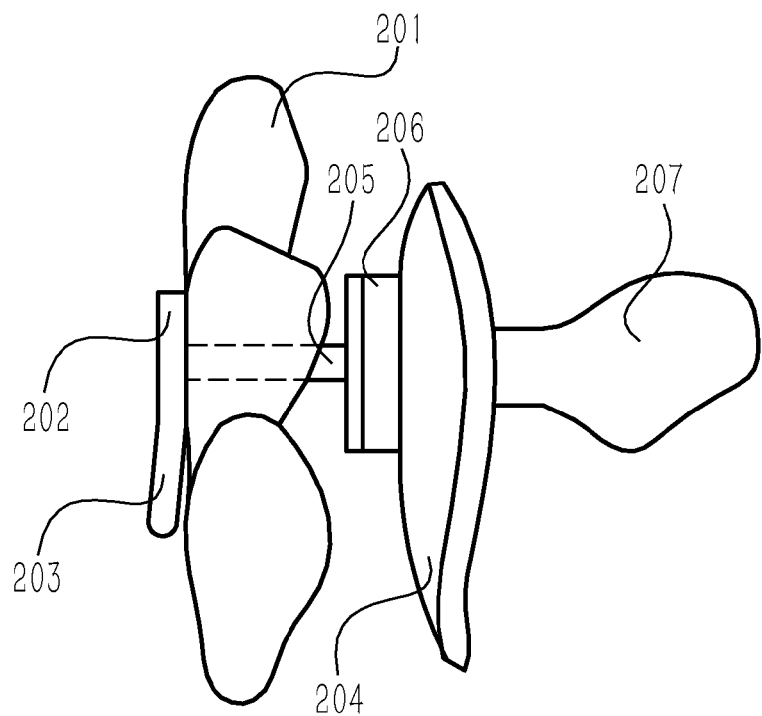
Figure 3:
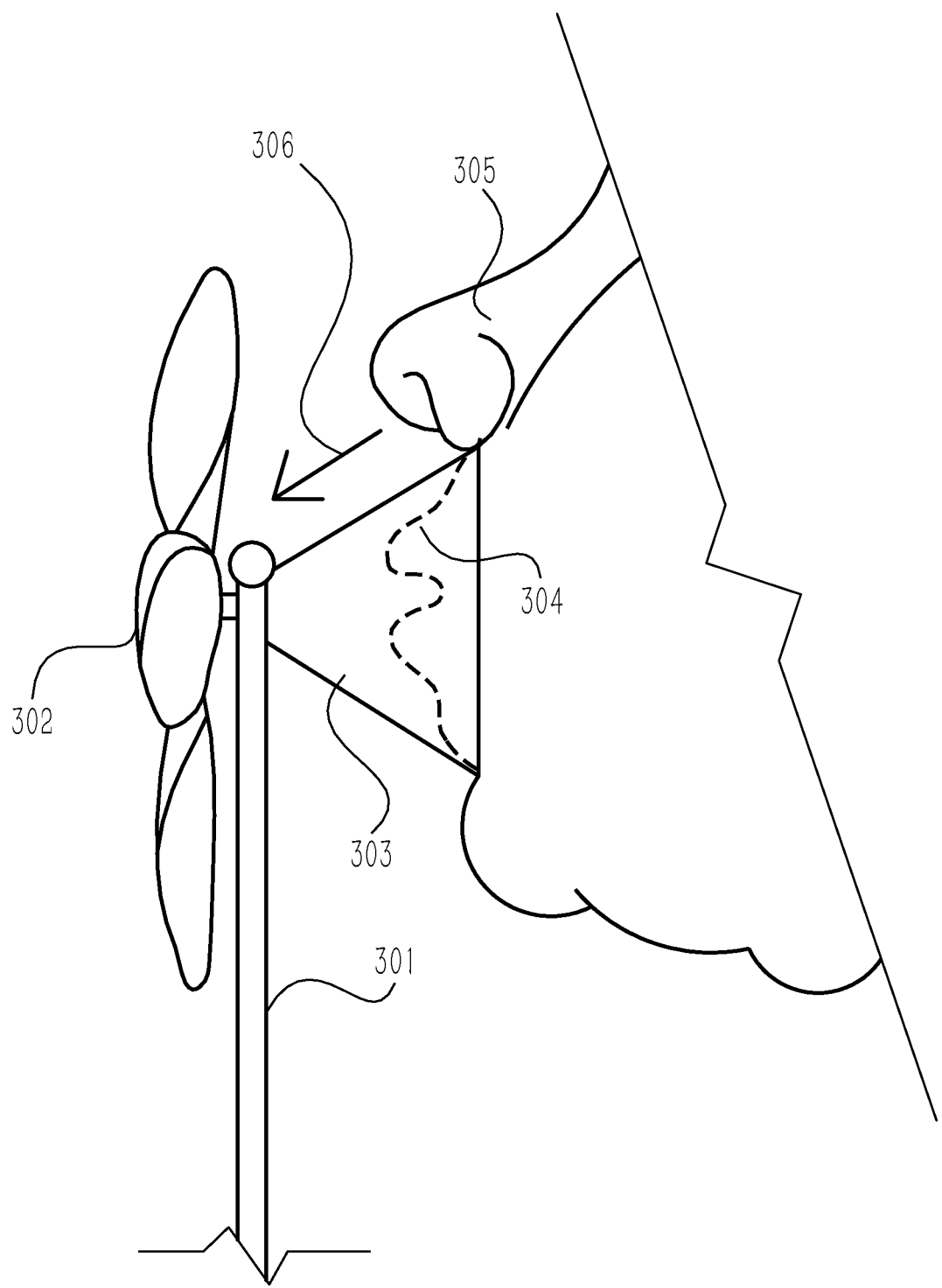
FIG. 3.

A preferred mouthpiece assembly is a pacifier. A pacifier typically comprises a nipple, mouth plate, and front plate, for example as depicted in FIGS. 1 and 2. The purpose of the front plate is to hold the nipple and mouth plate assembly in place. In some pacifiers the front plate also serves as an anchoring housing for the ends of a handle. The pacifier makes an excellent mouthpiece for the devices of the invention, because it is held firmly in place, just below the nose and serves as an ideal anchoring platform for a pinwheel.

Pacifiers have also proved for decades to be a reliable method for infants and toddlers to serve as a mouthpiece and have been placed in front of a variety of toys (as described above in the description of prior art). The child interacts with the attached toy while simultaneously suckling the pacifier. The invention may be implemented such that it complies with all applicable health and safety regulations in the jurisdiction(s) where it is marketed. For example, the regulations of the U.S. CONSUMER PRODUCT SAFETY-COMMISSION Office of Compliance, Requirements1 for Pacifiers, 16 C.F.R. Part 1511, which are hereby incorporated by reference in its entirety.

Another configuration of the mouthpiece is that of a cone, cup, or shield which is not inserted into the mouth of the user, but instead covers the mouth in order to suppress or block airflow from the mouth, forcing air through the nose.

The Handgrip

The handgrip element provides means of presenting the device to the child. The handgrip portion of the invention comprises a hand held element that may be grasped by the caretaker or the user. In one embodiment, the handgrip comprises a ring, which protrudes from the front end of the pinwheel, allowing the user to hold and position the device. In an alternative embodiment, the handgrip comprises a handle, which can be used to hold the device in place, for example a stick or pistol-grip handle. The pinwheel is attached to the handgrip element, and the purpose of the handgrip is to hold the entire device in such position such that air expelled through the child's nose will turn the blade assembly of the pinwheel. The handgrip may be positioned directly behind the pinwheel, under the pinwheel, or offset to the side of the pinwheel.

Discharge Catcher

Figure 4A:
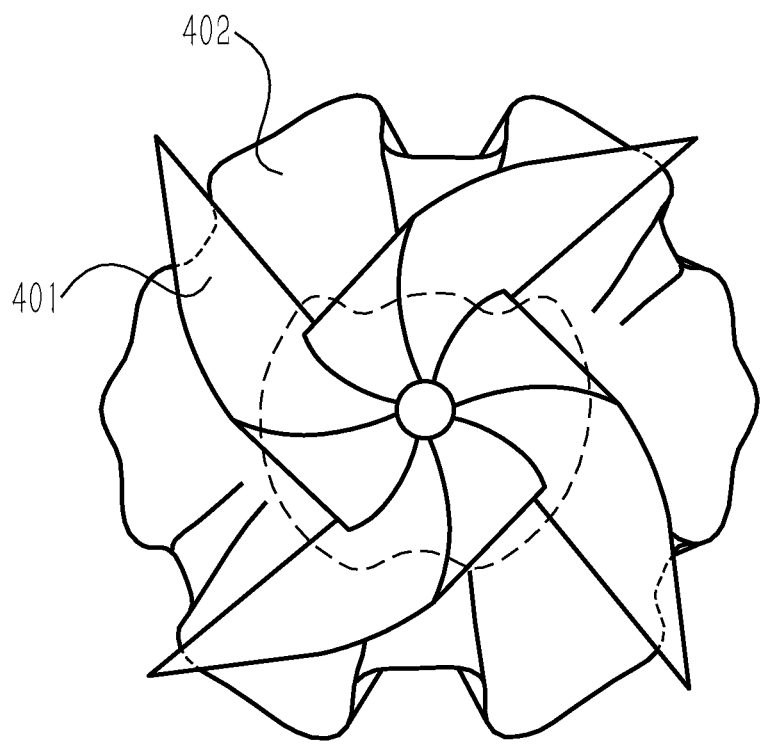
FIG. 4A depicts a front view and FIG. 4B depicts a side view of a device of the invention comprising a pinwheel element (401) affixed to a discharge catcher (402) having a fluted, bowl-shaped configuration, the two pieces being joined by an axle (403). The discharge catcher may be gripped by the user and held in place, or may be attached to a handgrip element such as a handle, for example at an attachment (404) point on the back of the discharge catcher.
Figure 4B:
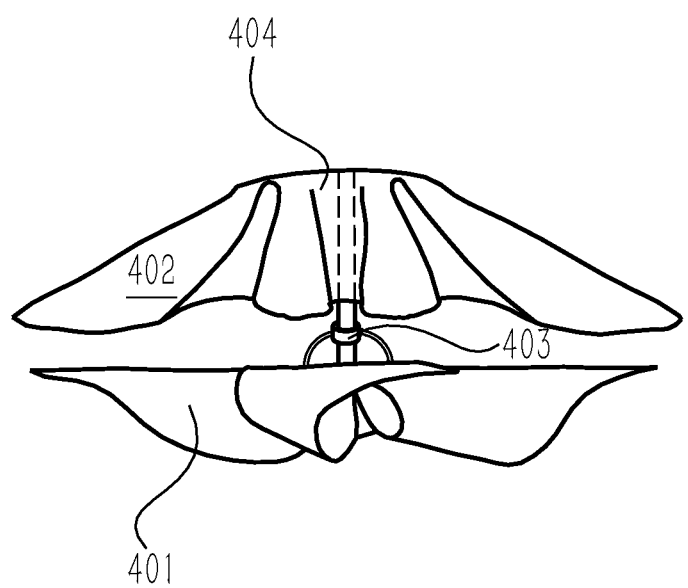

In some embodiments, the device may include a discharge catcher element designed to catch nasal discharge or to aid in the cleanup of nasal discharge. The discharge catcher may take any number of forms or shapes. For example, it may be configured as a small bowl, as depicted in FIG. 4, or as a plate, cylindrical body, or a concave shape. The discharge catcher may be positioned directly behind the pinwheel, under the pinwheel, or offset to the side of the pinwheel. The discharge catcher may take the form of standard facial tissue, which has been folded or rolled and incorporated into the device, which may be removed, unfolded or unrolled, and used. For example, one or more rolled tissues may be placed in a hollow handle of the device.

The discharge catcher may be made of material resilient enough to hold a fixed shape, but yet flexible enough to be crumpled in one's hand. The discharge catcher may be made of various materials including paper, wool, cotton, felt, plastic, latex, polyurethane, foam rubber, etc. The discharge catcher may be covered on one or all surfaces with soft, absorbent material. Similarly, the blades of the pinwheel, or other elements of the pinwheel may be made of, or may be wholly or partially covered, or coated with, soft absorbent materials. The absorbent materials used in the device may comprise synthetic and/or natural materials, including, for example, synthetic microfibers derived from, but not limited to, polyester, ethylene, acrylic, olefin, or propylene. Examples of soft materials made from microfibers include, but are not limited to, minky, polar fleece, acrylic, rayon and olefin; animal produced fibers including, including but not limited to, wool, or other animal hair, and/or silk; cellulosic fibers including, but not limited to, soft plant derived fibers, typically cellulosic fibers woven or meshed into various absorbent cloth materials that include, but are not limited to cellucotton, velour, bamboo velour, flannel, terry, tissue and zorb. Soft materials may be adhered to the discharge catcher using adhesives such as latex, rubber cement, polyvinyl acetate (PVAc), polyvinylpyrrolidone, acrylate, ethylene-vinyl acetate, polyurethane resin, starch, dextrin, casein, and pectin.

In one embodiment, the discharge catcher comprises a soft and/or absorbent material, as set forth above, which has been lightly impregnated with an adhesive, fixative, or stiffener, as known in the art (for example, latex, rubber cement, polyvinyl acetate (PVAc), polyvinylpyrrolidone, acrylate, ethylene-vinyl acetate, polyurethane resin, starch, dextrin, casein, and pectin), and is molded into the desired shape (for example, a fluted cup or bowl, as depicted in FIG. 4) and then dried, heat-treated, or otherwise treated to "set" the desired shape. In another embodiment, the discharge catcher is made of a soft and/or absorbent material, as set forth above, which is pressed or deformed to create the desired shape and then is subsequently sprayed or coated with a fixative such as an adhesive or stiffener, as known in the art (for example, latex, rubber cement, polyvinyl acetate (PVAc), polyvinylpyrrolidone, acrylate, ethylene-vinyl acetate, polyurethane resin, starch, dextrin, casein, and pectin), to a degree that the object will hold the desired shape, and is then and then dried, heat-treated, or otherwise treated to "set" the desired shape. In the embodiments of this paragraph, the amount of adhesive or fixative utilized is preferably just enough to aid the object in retaining its shape while still being capable of being readily crumpled by light pressure to break the bonds holding the shape and/or to restore some of the softness of the material.

In another embodiment, the discharge catcher comprises a soft and/or absorbent material, as set forth above, which is held in place to create the shape of the discharge catcher by a frame made of more rigid materials, such as stiff paper, polymeric material, or wood (e.g. thin rods such as toothpicks).

In one embodiment, the pinwheel blades and/or discharge catcher are made of a material that may be readily crumpled (e.g. paper or other fiber-based material) that may be bent, crumpled, flattened, or otherwise changed in conformation by the application of pressure, and then subsequently used as a tissue or flexible body to cleanup nasal discharge.

The Attachment Element

The attachment element provides a bridge so that the pinwheel assembly may be united with the mouthpiece and/or hand grip. The attachment element may be rigid or flexible. In one embodiment, the attachment element allows a degree of rotation or extension, such that the pinwheel may be optimally positioned to catch air flow from the user's nostrils. The attachment element may be either temporary (detachable) or permanently fixed. The attachment may be short or elongated and may be angled to couple the pinwheel to the remainder of the assembly in such a way that pinwheel the pinwheel is positioned below the nostrils of the user.

In some embodiments, the attachment element is temporary or reversible. For example, in one embodiment, complementary tongue and groove elements are utilized to reversibly affix the pieces of the device together. For example, in one embodiment the attachment element comprises a suction cup. In this embodiment, the outside apex of the suction cup is bonded to the pinwheel, generally with the pinwheel assembly substantially centered on the suction cup; for example, a suction cup having a diameter of 0.5 to 1.5 inches. This assembly can then be attached to the front, smooth, rounded plate of a pacifier, creating a temporary device to aid in nose blowing that can be easily removed and cleaned. Most pacifier designs are expected to be amenable to this design, provided their front plates comprises a flat surface suitable for attachment of a suction cup and are large enough to cover the whole of the suction cup.

Other reversible attachment systems may utilize a hook-and-loop material such as Velcro™ to link the pinwheel to the mouthpiece and/or handgrip. The complementary hook and loop elements could be located on either piece to be connected. The hook and loop elements themselves may be permanently fastened to each component with adhesive, as known in the art.

Use of the Device

The device is either held in place by the user, or positioned with the aid of a caretaker, such that the pinwheel is positioned at the proper angle and proximity to the nose of the child so that the pinwheel will revolve when the user blows his/her nose. The scope of the invention, in addition to the devices described herein, further includes methods of using the devices described herein. The invention further comprises business methods of co-packaging, co-marketing, or branding of the pinwheel devices of the invention with congestion-related products such as facial tissues, balms, decongestants, and allergy relief products. For example, a nasal pinwheel of the invention may be printed or otherwise emblazoned with a logo for a congestion-related product. Similarly, the nasal pinwheel may be co-packaged with the congestion related product, for example as a giveaway or loss-leader to incentivize purchase of the congestion-related product.

All patents, patent applications, and publications cited in this specification are herein incorporated by reference to the same extent as if each independent patent application, or publication was specifically and individually indicated to be incorporated by reference. The disclosed embodiments are presented for purposes of illustration and not limitation. While the invention has been described with reference to the described embodiments thereof, it will be appreciated by those of skill in the art that modifications can be made to the structure and elements of the invention without departing from the spirit and scope of the invention as a whole.

What is claimed is:

1. A device for aiding a child in blowing their nose, comprising
   a pinwheel assembly, the pinwheel assembly being positioned such that air expelled from the child's nostrils will turn the blades of the pinwheel; and
   a mouthpiece that is held by the mouth of the user; wherein the mouthpiece is configured to inhibit air from flowing through the mouth.

2. The device of claim 1, wherein the mouthpiece comprises a pacifier or a teething ring.

3. The device of claim 1, wherein
   the device comprises a detachable element such that the pinwheel assembly is detachable from the mouthpiece.

4. The device of claim 3, wherein
   the attachment element connecting the pinwheel to the pacifier comprises a structure or complementary structures selected from the group consisting of a suction cup, tongue and groove elements, and hook- and loop-connectors.

5. The device of claim 1, further comprising
   a discharge catcher.

6. The device of claim 5, wherein
   the discharge catcher is a substantially bowl-shaped body located behind the pinwheel.

7. A device for aiding a child in blowing their nose, comprising
   a pinwheel assembly, the pinwheel assembly being positioned such that air expelled from the child's nostrils will turn the blades of the pinwheel; and
   a discharge catcher, the discharge catcher comprising a soft, absorbent material.

8. The device of claim 7, wherein the discharge catcher may be crumpled or flattened and used to wipe up nasal discharge.

9. The device of claim 7, wherein
   the pinwheel blades comprise the discharge catcher comprising a soft absorbent material.

* * * * *